(12) United States Patent
Duclos et al.

(10) Patent No.: US 9,364,991 B2
(45) Date of Patent: Jun. 14, 2016

(54) NOZZLE FOR FORMING CONTAINERS PROVIDED WITH AN INTERCHANGEABLE TIP IN WHICH ELEMENTS MATCHING THE FORMAT OF THE NECK OF THE CONTAINER ARE EMBEDDED

(71) Applicants: Yves-Alban Duclos, Octeville sur Mer (FR); Denis Cardine, Octeville sur Mer (FR)

(72) Inventors: Yves-Alban Duclos, Octeville sur Mer (FR); Denis Cardine, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 14/388,393

(22) PCT Filed: Mar. 13, 2013

(86) PCT No.: PCT/EP2013/055127
§ 371 (c)(1),
(2) Date: Sep. 26, 2014

(87) PCT Pub. No.: WO2013/143848
PCT Pub. Date: Oct. 3, 2013

(65) Prior Publication Data
US 2015/0151468 A1 Jun. 4, 2015

(30) Foreign Application Priority Data
Mar. 27, 2012 (FR) ...................................... 12 52717

(51) Int. Cl.
*B29C 49/58* (2006.01)
*B29C 49/06* (2006.01)

(52) U.S. Cl.
CPC ................. *B29C 49/58* (2013.01); *B29C 49/06* (2013.01); *B29C 2049/5893* (2013.01)

(58) Field of Classification Search
CPC ............ B29C 49/58; B29C 2049/5844; B29C 2049/5893
See application file for complete search history.

(56) References Cited

U.S. PATENT DOCUMENTS 4,552,527 A * 11/1985 Hunter .................... B29C 49/58
141/311 R
4,745,674 A * 5/1988 Abe .................... B23B 31/1071
279/4.04

(Continued)

FOREIGN PATENT DOCUMENTS

DE 10 2008 025775 A1 12/2009
EP 1 927 461 A1 6/2008

(Continued)

OTHER PUBLICATIONS

International Search Report, dated Jun. 11, 2013, from corresponding PCT application.

*Primary Examiner* — Robert B Davis
(74) *Attorney, Agent, or Firm* — Young & Thompson (57) ABSTRACT

A nozzle (10) for forming containers made of a thermoplastic material by injecting a pressurized fluid into a neck (14) of a preform (12), includes: a mounting (24) which is provided with an inlet pipe (36) for a pressurized fluid along a vertical axis (A); a nozzle tip (26) which axially extends the inlet pipe (36), and which can be sealingly coupled to the neck (14) of the preform (12) via at least one element (42, 44) matching the format of the neck (14); an element for removably attaching the nozzle tip (26) onto the mounting (24); and a stabilizing tube (106) resiliently biased toward the lower stop position thereof via a resilient member (116) that is permanently accommodated in the mounting.

16 Claims, 7 Drawing Sheets

(56) References Cited

U.S. PATENT DOCUMENTS

| | | | |
|---|---|---|---|
| 8,708,680 B2 * | 4/2014 | Geltinger | B29C 49/12 425/3 |
| 2008/0124424 A1 | 5/2008 | Mie et al. | |
| 2010/0159058 A1 | 6/2010 | Doudement | |
| 2010/0176540 A1 | 7/2010 | Sperka et al. | |
| 2011/0120840 A1 * | 5/2011 | Schonberger | B29C 49/4205 198/867.02 |
| 2011/0266572 A1 | 11/2011 | Dobbertin et al. | |
| 2012/0114783 A1 | 5/2012 | Lambert | |

FOREIGN PATENT DOCUMENTS

| | | |
|---|---|---|
| EP | 2 202 049 A1 | 6/2010 |
| FR | 2 944 468 A1 | 10/2010 |
| WO | 2009/007315 A2 | 1/2009 |

* cited by examiner

NOZZLE FOR FORMING CONTAINERS PROVIDED WITH AN INTERCHANGEABLE TIP IN WHICH ELEMENTS MATCHING THE FORMAT OF THE NECK OF THE CONTAINER ARE EMBEDDED

The invention relates to a nozzle for forming containers from thermoplastic material including a removable nozzle tip.

More specifically, the invention relates to a nozzle for forming containers from thermoplastic material by injection of a pressurized fluid into a neck of a pre-form, the nozzle comprising:
- a mounting fitted with an inlet pipe for pressurized fluid along a vertical axis;
- a nozzle tip that axially extends the inlet pipe and that can be connected sealingly to the neck of the pre-form by means of at least one element matching the format of the neck;
- removable means for attaching the nozzle tip to the mounting.

In an installation of this type, each final container is obtained by blowing a pre-form heated to a specific temperature. The hot pre-form is inserted into a mold, then a nozzle is connected to the neck of the pre-form so that a pressurized forming fluid can be blown into the pre-form. Under the effect of the pressure, the walls of the pre-form move to fit the walls of the mold, to form the final container.

The final shape of the neck of the pre-form is already formed. It is therefore essential to preserve the integrity of the neck during the forming operation.

Facilities for manufacturing containers from thermoplastic material are designed to enable containers of different shapes and sizes to be manufactured. As such, a single facility is able to handle pre-forms with necks of different formats.

To ensure efficient blowing, without energy loss and without damaging the neck of each pre-form, it is necessary to change certain elements of the nozzle, commonly referred to as "customization elements". The dimensions of these elements match each neck format. Hereinafter, these elements shall be referred to as "matching elements".

The nozzle tip is usually in the form of a housing that is mounted on the mounting using attachment means. Attaching the matching elements by interposition between the nozzle tip and the mounting is known.

The housing of the nozzle tip is open at the top through an upper opening. The matching elements are arranged in the housing of the nozzle tip through the upper opening. The matching elements are not however attached in the housing. When the housing is mounted on the mounting, the mounting closes the upper opening of the housing, thereby holding the matching elements in position in the housing.

When the nozzle tip is withdrawn, the matching elements are free to be removed from the housing to be swapped with other matching elements before the same housing is reattached to the mounting.

However, such devices do not enable the nozzle to be swapped quickly. Indeed, each matching element has to be swapped one by one.

Furthermore, when the nozzle tip is removed, the matching elements are no longer held in the housing. There is then a risk of these elements being lost.

Furthermore, the means for attaching the nozzle tip to the mounting do not enable the nozzle tip to be removed quickly.

To overcome these drawbacks specifically, the invention proposes a nozzle as described above, characterized in that the matching elements are embedded in the nozzle tip independently of the attachment thereof to the mounting.

According to other features of the invention:
- the matching elements include a seal that is designed to surround the neck of the pre-form with a determined radial clearance between the neck and the seal;
- the matching elements include a stabilization tube designed to be coaxial with the neck of the pre-form and to have a diameter such that a circular edge of the lower extremity of the tube is received against a lip of the neck;
- the stabilization tube is mounted slidingly and axially in the nozzle tip between a lower stop position against a first stop face of the tip and an upper stop position against a second stop face of the tip;
- the stabilization tube is elastically pressed towards the lower stop position thereof by means of an elastic member that is permanently housed in the mounting;
- the mounting includes a carriage sliding axially between an upper idle position and a lower forming position, the nozzle tip being attached to the carriage;
- the elastic member acts on the stabilization tube by means of a rod that is mounted slidingly in the mounting, the rod being clamped into an elastic retainer on the stabilization tube to temporarily constrain the stabilization tube to move with the rod;
- a seal is placed radially between the mounting and the nozzle tip to enable a sealed connection between the tip and the inlet pipe in the blowing position of the carriage;
- the seal is borne by the mounting;
- the removable attachment means include a male part and a female part that can be fitted together axially;
- the attachment means include a locking mechanism comprising a truncated conical seat that is attached to the male part and that includes ball bearings that are carried with radial clearance by the female part, the ball bearings being able to occupy an internal locking position in which they are pushed against the conical seat to attach the male part to the female part;
- the truncated conical seat has a circular shape formed about the axis of the nozzle such that the ball bearings can occupy the locking position thereof regardless of the orientation of the nozzle tip about the axis thereof;
- the female part includes a peripheral cage provided with holes seating the ball bearings, and a lock provided with an annular ramp, mounted about said cage, that can be moved between a locked position in which the ramp is radially adjacent to the ball bearings, and a released position in which the ramp is removed from the ball bearings;
- the mounting bears the peripheral cage, the cage radially delimiting an external annular space in which is mounted a slide that can be moved between a locked position in which it is radially adjacent to the ball bearings, and a released position in which it is removed from the ball bearings;
- the cage and the carriage form an integral assembly;
- the slide is pushed towards the locking position thereof by at least one return spring;
- the lock is pushed towards the locked position thereof by at least one return spring;
- the lock bears the annular ramp.

The invention also relates to a device for swapping a tip of a nozzle formed according to the teachings of the invention, characterized in that it includes a first disassembly member that is designed to grasp the lock in the locked position thereof, the disassembly member being movable such as to move the lock between the locked position thereof and the released position thereof.

According to other features of the swapping device:
the device includes at least one second holding member that is designed to grasp a nozzle tip, the supporting member being movable such as to move the nozzle tip between the engaged position thereof inside the female element and a position disengaged from the female element;
the movements of the first disassembly member and/or of the second holding member are controlled automatically.

Figure 1:
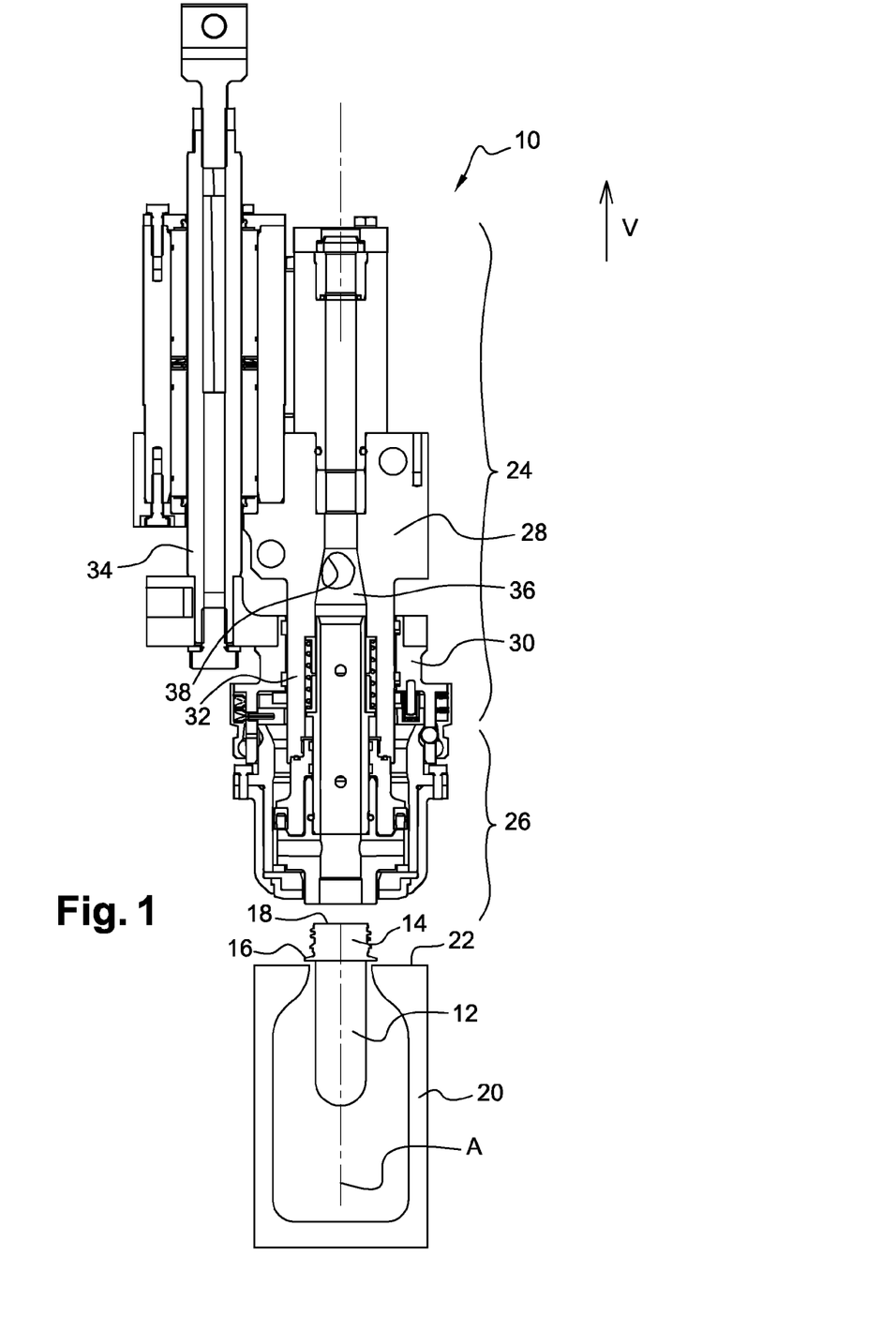
FIG. 1 is a cross-sectional overview along a transverse vertical axial plane that shows a nozzle fitted with a tip formed according to the teachings of the invention, the nozzle occupying an upper idle position above a mold provided with a pre-form.

Other features and advantages are given in the detailed description below, provided with reference to the attached drawings, in which:

FIG. 1 shows a nozzle 10 for forming containers from thermoplastic material by injection of a pressurized fluid into a pre-form 12.

The forming fluid is in this case a gas, for example compressed air.

In a known manner, the pre-form 12 is a test-tube-shaped container with a vertical axis "A" that is made of a thermoplastic material.

The lower body of the pre-form 12 is intended to be formed by deformation of the walls thereof. For this purpose, the pre-form 12 is heated in a thermal conditioning oven to make the walls thereof malleable.

The pre-form 12 includes a neck 14 that is arranged at the upper extremity thereof. The final shape of the neck 14 is already formed, i.e. the neck 14 will not be deformed during the forming operation. For this reason, the neck 14 is kept cold.

The neck 14 is separated from the body of the pre-form 12 by a lower flange 16. The top of the neck 14 is delimited by a circular upper end edge hereinafter referred to as the "lip 18". The external cylindrical face of the neck 14 in this case includes a thread for attaching a lid of the final container.

The pre-form 12 thus heated is received in the cavity of a mold 20. The mold 20 has an upper horizontal face 22. The upper face 22 of the mold 20 has a through-hole for the neck 14. The flange 16 rests on the upper face 22 of the mold 20 such that the neck 14 protrudes vertically above the upper face 22 of the mold 20.

The mold 20 is usually made of two half-molds assembled along a vertical joining plane passing through the through-hole for the neck 14. This arrangement makes it possible to eject the final container by separating the two half-molds 20 on completion of the forming operation.

Figure 2:
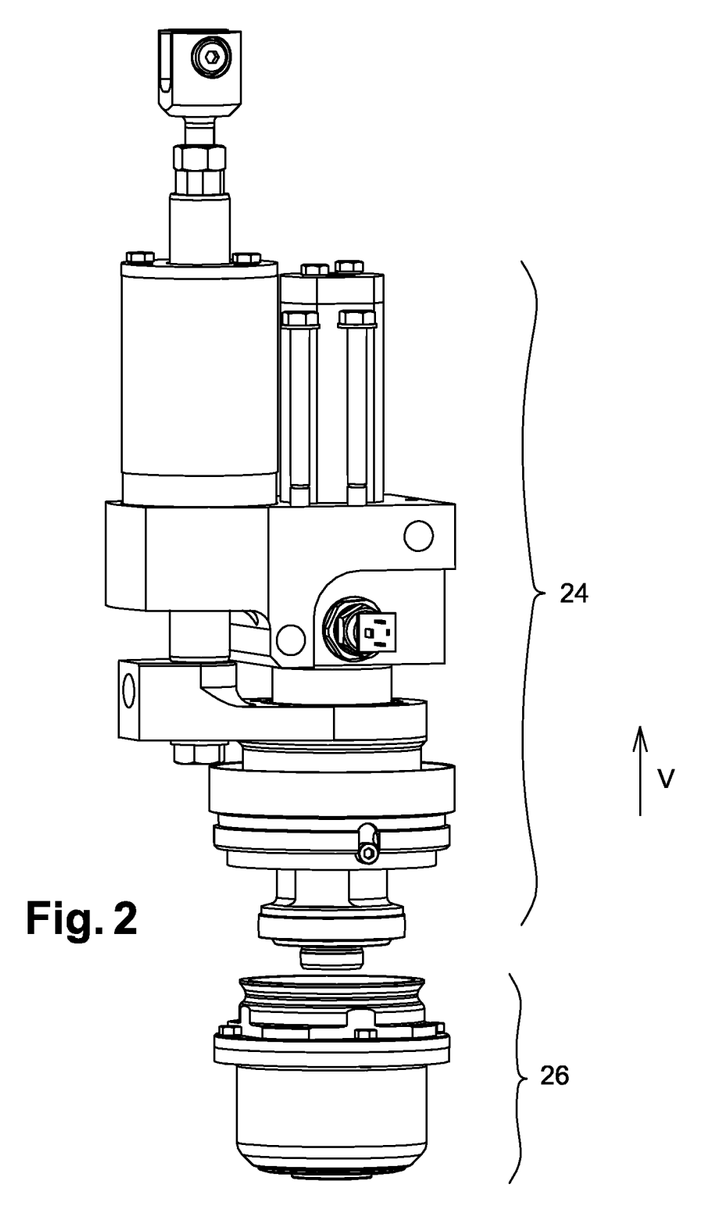
FIG. 2 is a perspective view showing the nozzle in FIG. 1, the tip having been removed.

The nozzle 10 is described in detail below. The nozzle 10 comprises principally a mounting 24 and a removable nozzle tip 26, as shown in particular in FIG. 2.

Figure 3:
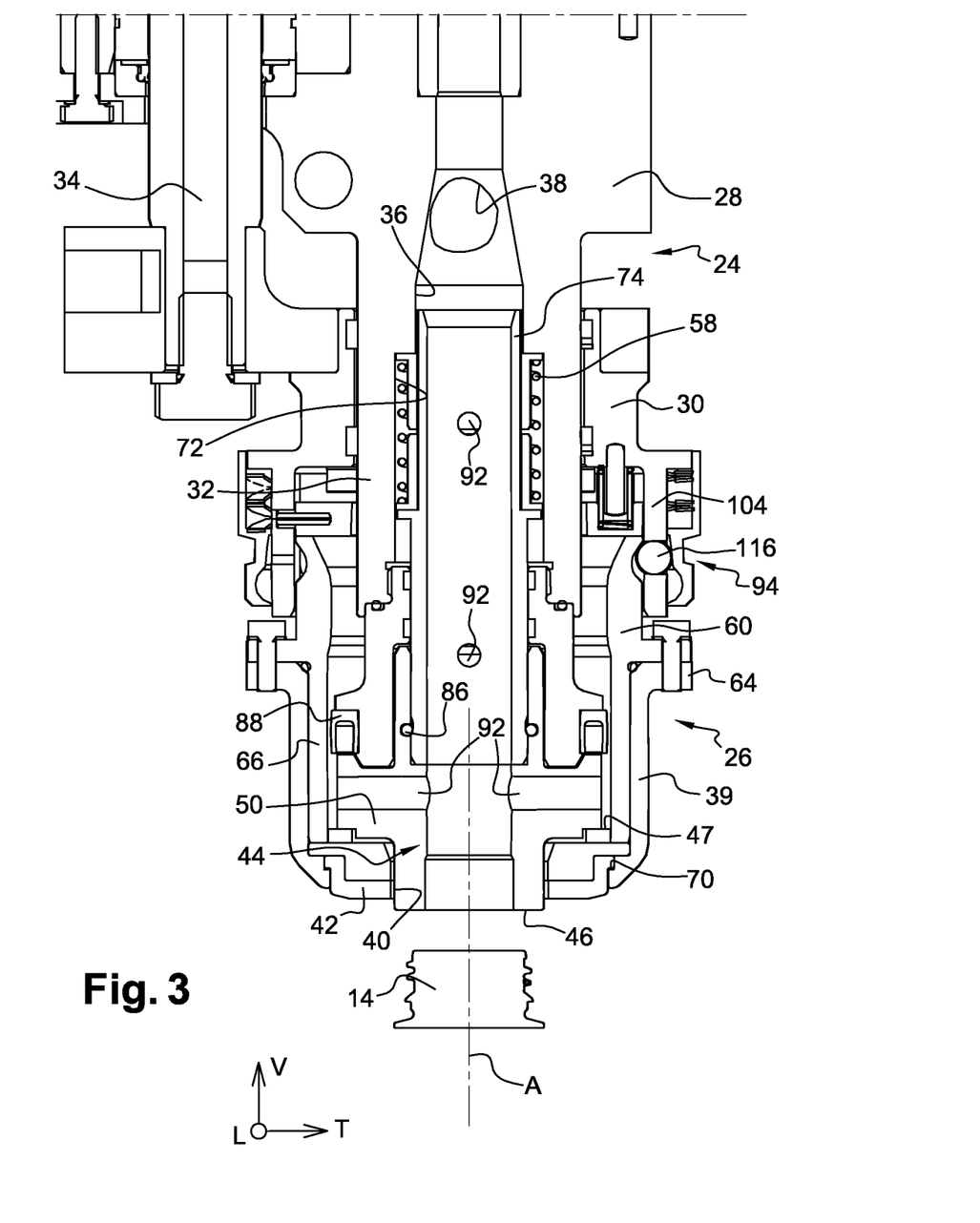
FIG. 3 is a detailed view on a larger scale showing the lower part of the nozzle in FIG. 1 and the tip.
Figure 4:
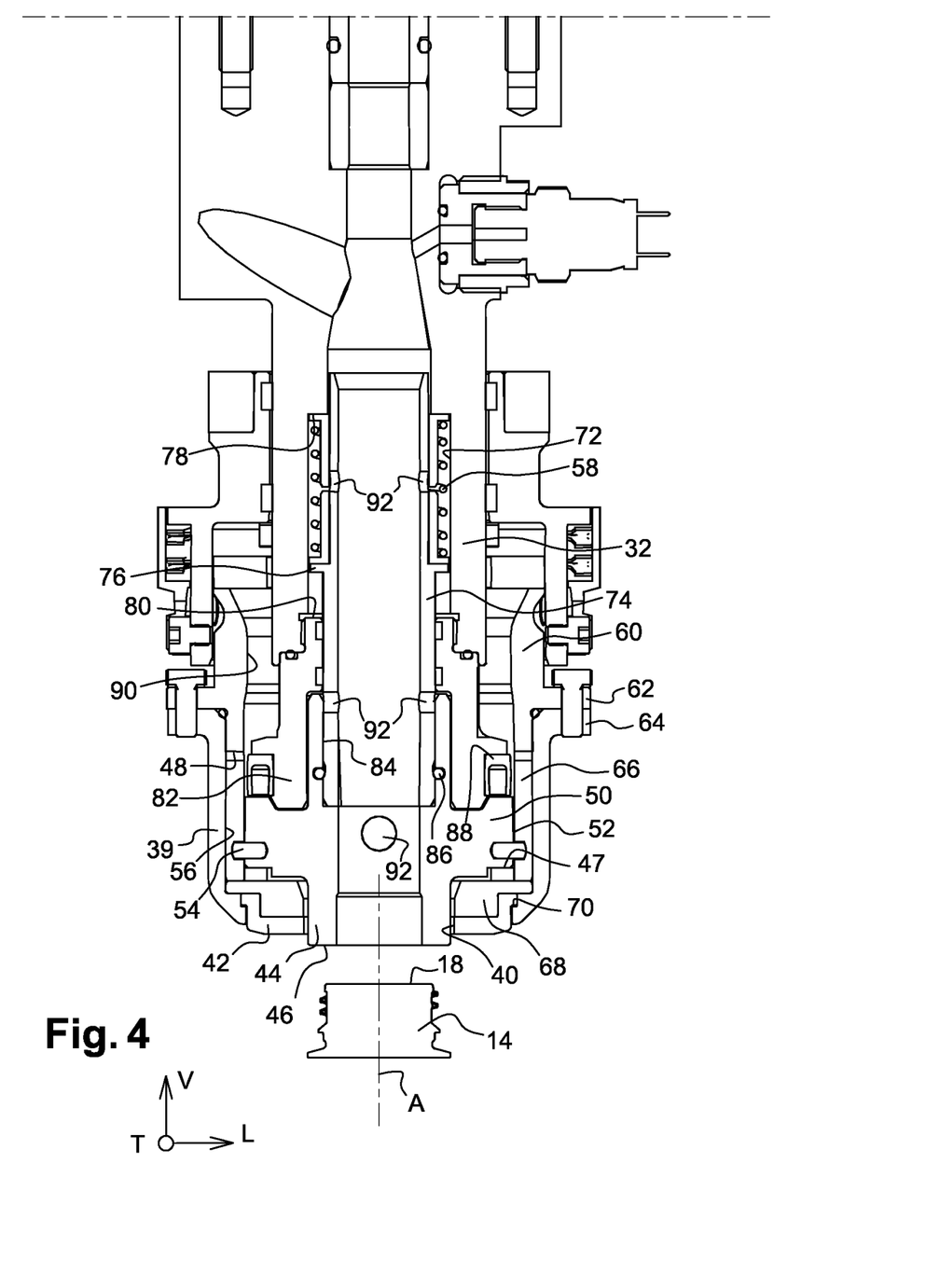
FIG. 4 is a cross-section view of the nozzle in FIG. 3 taken along a longitudinal vertical axial plane.
Figure 5:
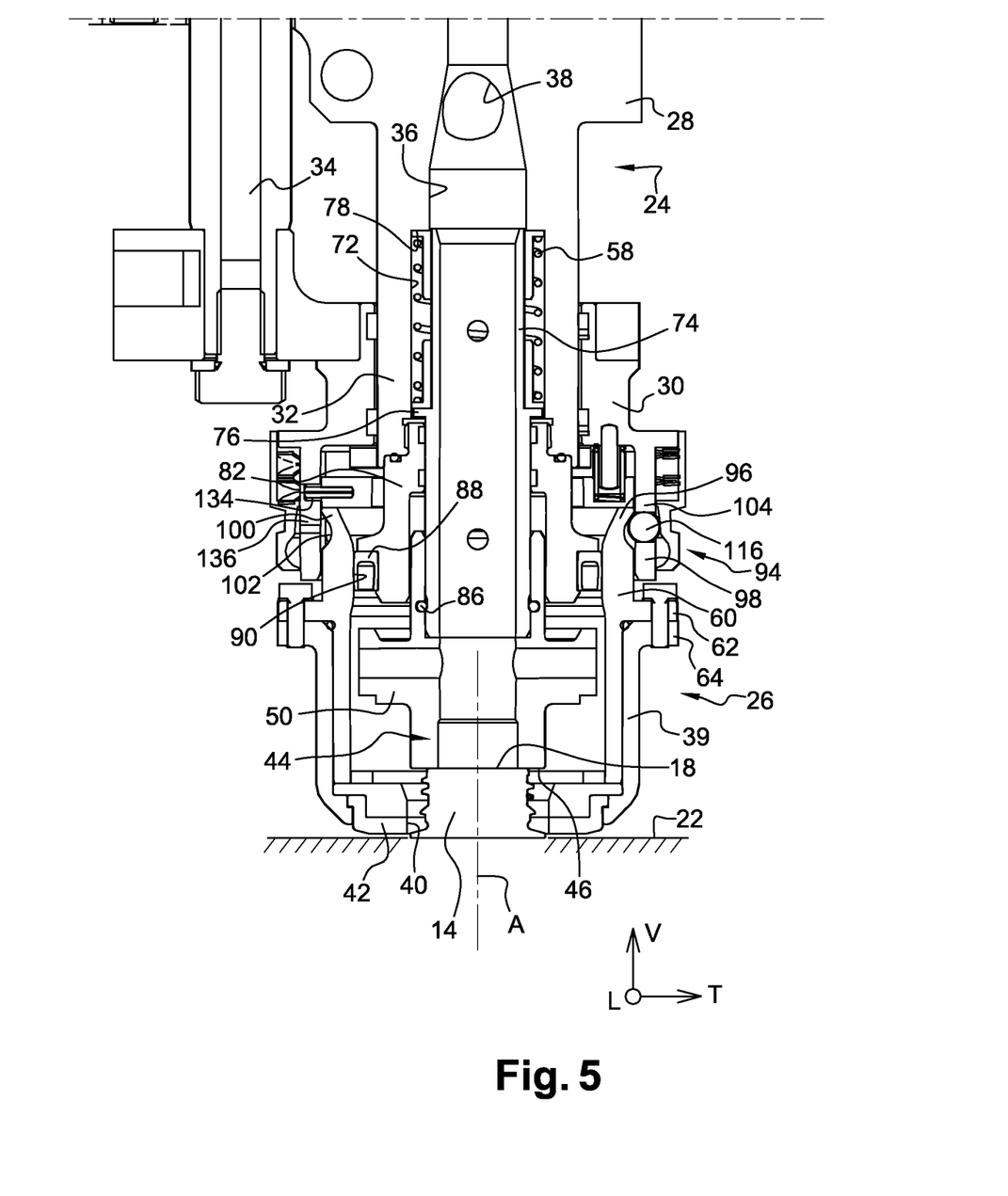
FIG. 5 is a view similar to the view in FIG. 3 in which the nozzle occupies a lower forming position.

As shown in greater detail in FIG. 3, the mounting 24 includes a frame 28 that is fixed in relation to the mold 20, and a carriage 30 that is mounted slidingly and vertically on one lower extremity of the frame 28. The carriage 30 can therefore slide between an upper idle end position, as shown in FIGS. 1, 3 and 4, and a lower forming end position, as shown in FIG. 5.

More specifically, the lower extremity of the frame 28 forms a cylindrical column 32 the axis of which is coaxial with the axis "A" of the pre-form 12. The carriage 30 has a tubular shape enabling it to be mounted slidingly about the column 32.

The movements of the carriage 30 are controlled by an actuator (not shown). In this case this is a piston, of which only the push rod 34 is shown. The push rod 34 is guided slidingly on the frame 28 parallel to the axis "A" of the pre-form. The lower extremity of the push rod 34 is attached to the carriage 30 to control both the ascent and descent of the carriage 30.

The mounting 24 is fitted with an inlet pipe 36 for pressurized fluid. In this case the pipe 36 is arranged coaxially with the axis "A" of the pre-form 12. The pipe 36 passes through the column 32 of the frame and leads to the lower extremity of the column 32. The inlet pipe 36 can be supplied with pressurized fluid by means of a feed orifice 38 that flows radially into the inlet pipe 36 above the column 32.

The nozzle tip 26 is mounted on the carriage 30 using removable attachment means that are described in greater detail below.

The nozzle tip 26 is more specifically arranged at one lower extremity of the carriage 30 of the mounting 24, vertically aligned with the neck 14 of the pre-form 12.

The nozzle tip 26 consists of a casing in the form of a cylindrical cover 39 with a vertical axis "A". The cover 39 is open at the top and has at the lower extremity thereof a hole 40 the diameter of which is slightly greater than the diameter of the flange 16 of the neck 14.

The hole 40 enables the neck 14 to penetrate the cover 39 when the carriage 30 is in the lower forming position thereof. In this forming position of the carriage 30, the lower face of the cover 39 is designed to be in contact with the upper face 22 of the mold 20.

When the tip 26 is attached to the carriage 30, the inlet pipe 36 is attached sealingly to the inside of the cover 39. The tip 26 thus extends axially towards the bottom of the inlet pipe 36.

The nozzle tip 26 can be connected sealingly to the neck 14 of the pre-form 12 using elements matching the format of said neck 14.

A first matching element is formed by a joint 42 by means of which the tip 26 is held in sealing contact against the upper face 22 of the mold 20. For this purpose, the joint 42 is arranged at the base of the cover 39.

This joint 42 has an annular shape and it internally delimits the through-hole 40 for the neck 14. The internal diameter of the joint 42 surrounds the flange 16 of the neck 14 with a predetermined radial clearance. This radial clearance is as small as possible to prevent the pressurized fluid from leaking through the joining plane of the two half-molds 20.

Consequently, when a new format of the neck 14 is to be blown by the nozzle 10, it is preferable to change the joint 42. Indeed, a neck 14 that is too large cannot be received in a hole 40 that is too small. Conversely, if the radial clearance between the neck 14 and the joint 42 is too large, the leaks of forming fluid through the joining plane could significantly increase consumption of forming fluid.

A second matching element is formed by a stabilization tube 44. This stabilization tube 44 is arranged in the cover 39 coaxially with the neck 14. A circular lower end edge 46 of the stabilization tube 44 is intended to be received against the lip 18 of the neck 14 in order to flatten the flange 16 against the upper face 22 of the mold 20 during the forming operation. It is therefore necessary that the diameter of the stabilization tube 44 matches the format of the neck 14.

Use of the stabilization tube 44 in particular prevents the pre-form 12 from lifting off the mold 20 during forming. Such lifting would result in the introduction of forming fluid in the molding cavity, thereby causing forming faults in the container.

Furthermore, on completion of the blowing operation, the neck 14 of the final container is grasped automatically by a clamp (not shown) before the mold 20 is opened to prevent the container from falling. The stabilization tube 44 helps to ensure that the neck 14 is correctly grasped by the clamp by holding the neck 14 in a fixed position in the mold 20.

The stabilization tube 44 must bear vertically downwards onto the lip 18 without thereby damaging the neck 14. For this purpose, the stabilization tube 44 is mounted slidingly and axially in the nozzle tip 26 between a lower end stop position against a first stop face 47 of the tip 26, as shown in FIGS. 3 and 4, and an upper end stop position against a second opposing stop face 48 of the tip 26, which can be seen in FIG. 4.

In the lower end position, the lower end edge 46 of the stabilization tube 44 extends vertically beneath the level of the seal 42.

A disc 50 extends radially outwards from the external cylindrical wall of the stabilization tube 44. The disc 50 is located halfway up the stabilization tube 44. As shown in FIG. 4, the peripheral rim 52 of the disc 50 is in radial contact with clearance with the internal cylindrical wall of the cover 39 such as to guide the vertical sliding of the stabilization tube 44.

To further improve the guidance of the sliding of the stabilization tube 44, the rim 52 is provided with two diametrically opposed, protruding trunnions 54, as shown in FIG. 4. Each trunnion 54 is seated in a related vertical slot 56 formed in the internal cylindrical wall of the cover 39.

To enable the lower edge 46 of the stabilization tube 44 to bear against the lip 18 of the neck 14, the stabilization tube 44 is forced elastically towards the lower end position thereof by an elastic member 58, which is described in greater detail below.

To facilitate changing the nozzle tip 26, the matching elements 42, 50 are embedded in the nozzle tip 26 independently of the attachment of same on the mounting. Consequently, when the tip 26 is removed from the mounting 24, there is no risk of the matching elements 42, 50 being lost.

Furthermore, it is possible to use preassembled nozzle tips 26 for each format of neck 14. This enables the nozzle tip 26 to be swapped quickly.

The matching elements 42, 50 are embedded in the nozzle tip 26 using a crown 60 which is arranged on top of the cover 39. As shown in particular in FIG. 7, the crown 60 has an annular shape to enable the lower end of the column 32 of the mounting 24 to enter the cover 39.

Figure 7:
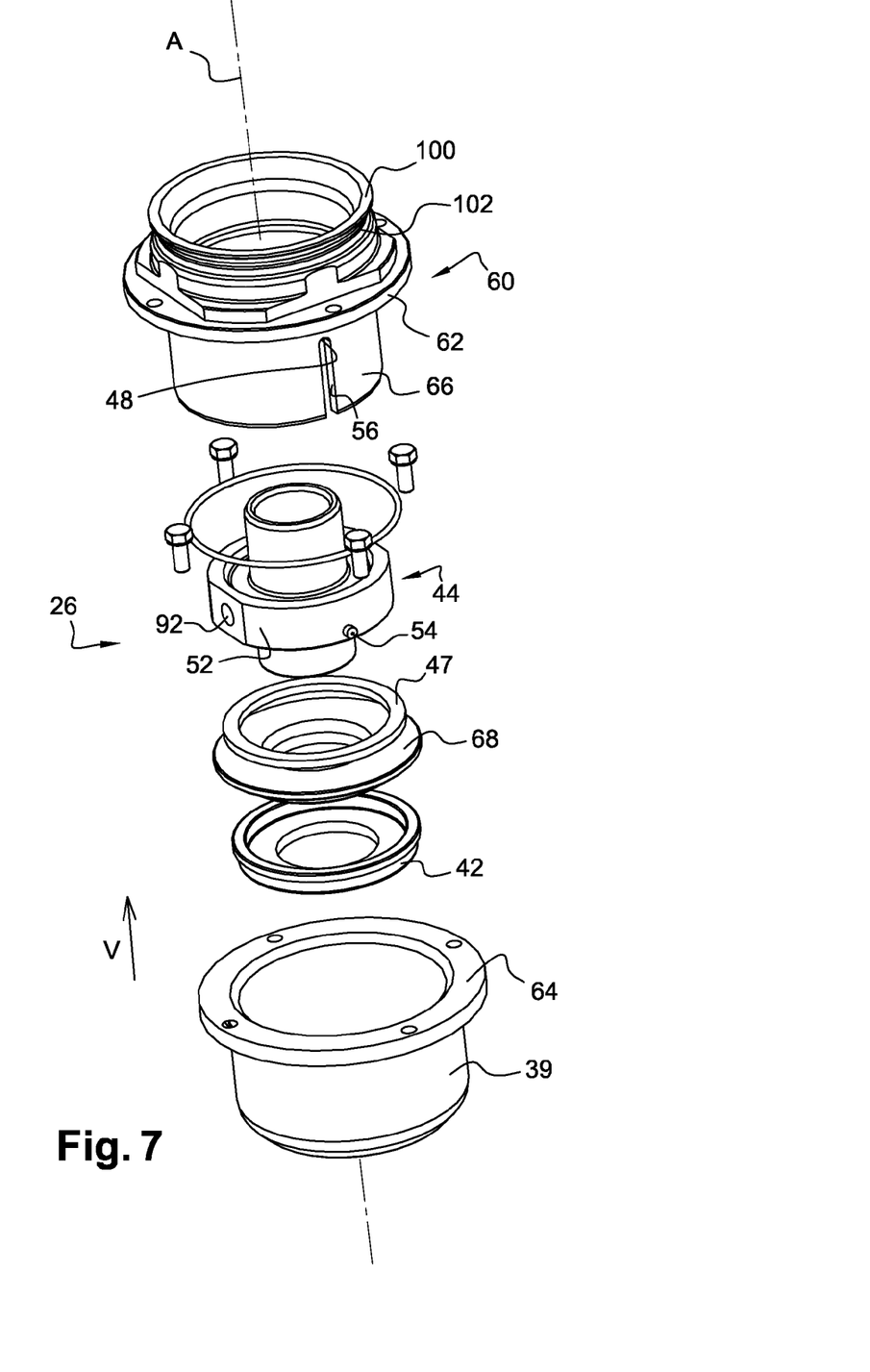
FIG. 7 is an exploded perspective view showing the tip of the nozzle in FIG. 1.

The crown 60 extends substantially as an upwards prolongation of the cylindrical wall of the cover 39. However, the crown 60 has an internal diameter that is less than the internal diameter of the cover 39.

The crown 60 has a radial attachment flange 62 that is received against the complementary flange 64 of the cover 39. In this case, the attachment is realized using bolts.

The crown 60 has a cylindrical skirt 66 that extends vertically downwards from the flange 62. The skirt 66 is received in the cover 39 through the upper through-hole forming a sleeve against the internal cylindrical wall of the cover 39.

The seal 42 of the nozzle 26 is arranged beneath a removable lower base 68 of the cover 39.

The section of the lower extremity of the cover 39 narrows to form an upward facing lower shoulder surface 70. The base 68 butts vertically against the shoulder surface 70 of the cover 39 with interposition of a peripheral portion of the seal 42. When the crown 60 is attached to the cover 39, the lower extremity of the skirt 66 bears against the base 68 to vertically fix the base 68 in relation to the cover 39.

Furthermore, the skirt 66 acts as a guide wall for the stabilization tube 44. As shown in FIG. 7, the guide slots 52 are formed by two vertical slots made in the skirt 66. The slots open downwards to enable assembly of the crown 60 after insertion of the stabilization tube 44 in the cover 39 via the upper orifice.

The first stop face 47 that forms the lower stop for the stabilization tube 44 is formed by an annular buffer that is arranged on the removable base 68.

The second stop face 48 that forms the upper stop for the stabilization tube 44 is formed by the upper extremity of the two slots 52 of the skirt 66.

Advantageously, the elastic member 58 that forces the stabilization tube 44 downwards is seated permanently in the mounting 24. As a result, a single elastic member 58 can be used for several formats of nozzle tip 26 without needing to change said elastic member 58.

The elastic member 58 is received in a seat 72 that is formed in the inlet pipe 36 passing through the column 32. It acts on the stabilization tube 44 by means of a tubular rod 74 with an axis "A" that is received slidingly and vertically in the inlet pipe 36 of the column 32.

This tubular rod 74 forms a concentric pipe in the feed pipe 36 to guide the forming fluid to the pre-form 12 via the stabilization tube 44.

The sliding of the tubular rod 74 is limited in both directions by a flange 76 butting against an upper stop face 78 and against a lower stop face 80. The upper stop face 78 is formed by a shoulder of the inlet pipe 36, while the lower stop face 80 is formed by a shoulder on a closing ring 82 that is attached beneath the column 32 surrounding the tubular rod 74. The ring 82 thereby enables the elastic member 58 and the tubular rod 74 to be assembled in the inlet pipe 36 by insertion via the lower extremity of the pipe 36.

The elastic member 58 is interposed between the upper stop face 78 and the flange 76 to push the tubular rod 74 downwards.

Figure 6:
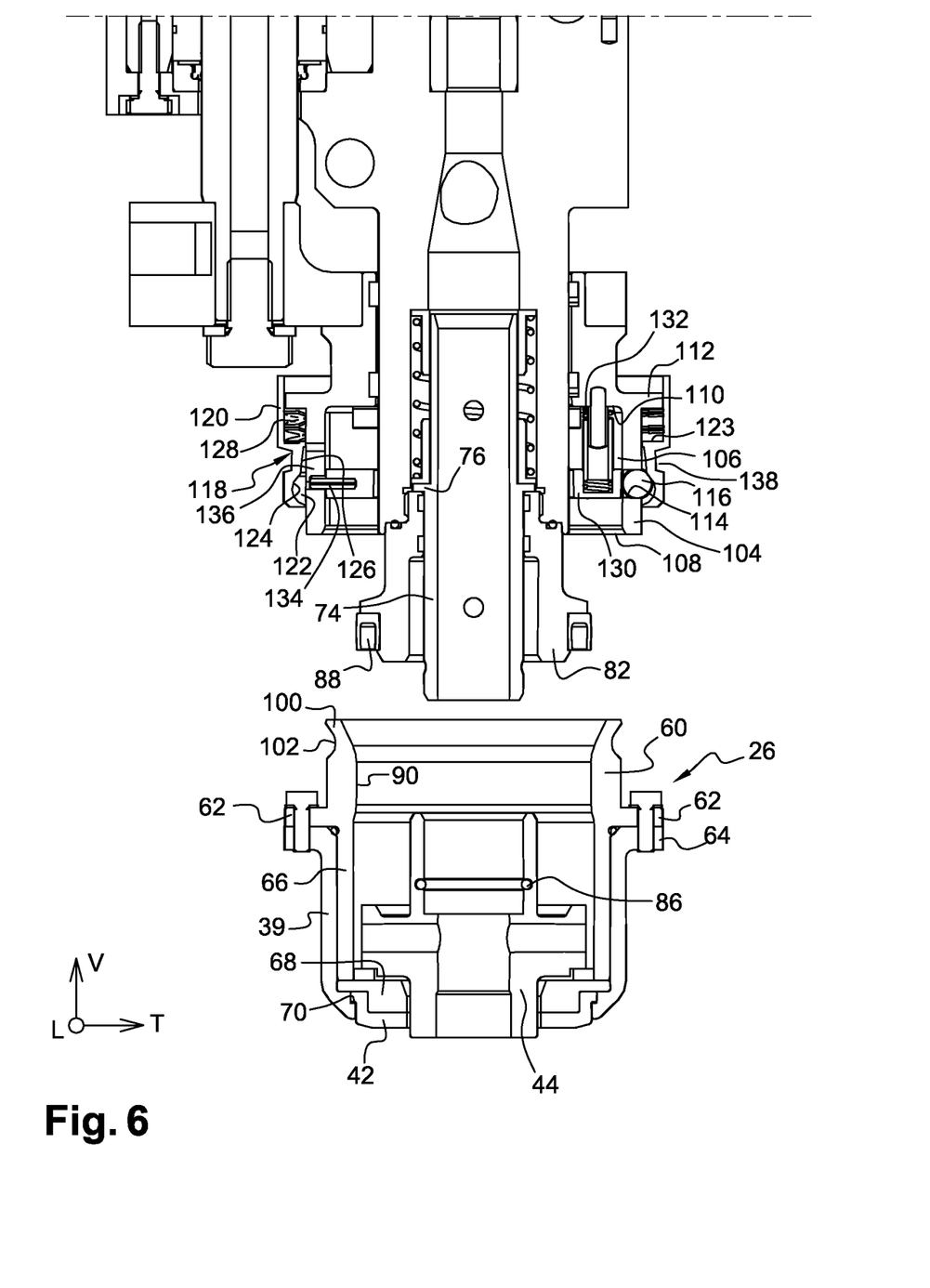
FIG. 6 is a view similar to the one in FIG. 3 in which the tip of the nozzle is removed.

The lower extremity of the tubular rod 74 protrudes downwards beyond the ring 82, as shown in FIG. 6, to enable it to be received in the cover 39. The lower extremity of the rod 74 is fitted into an upper complementary connection sleeve 84 of the stabilization tube 44. The tubular rod 74 therefore butts downwards against the stabilization tube 44.

Given that the stabilization tube 44 is able to move with the carriage 30, while the upper stop face 78 remains fixed, the elastic member 58 is assembled prestressed such as to push the tubular rod 74 downwards regardless of the position of same, including when it is butted against the lower stop face 80, as shown in FIG. 6.

Furthermore, the carriage 30 can be moved to the lower forming position thereof in the absence of any pre-form 12 in the mold 20. Such use of the nozzle 10 with an empty mold 20 is for example required to carry out installation adjustments. When the mold 20 is empty, it is preferable to prevent the stabilization tube 44 from falling against the upper face 22 of the mold 20 to prevent premature wearing of the mold 20 or of the stabilization tube 44. Indeed there is a risk of the stabilization tube 44 being inserted accidentally into the through-hole 40 for the neck 14 and getting jammed between the two half-molds 20.

For this purpose, the stabilization tube 44 is held vertically on the tubular rod 74 using an elastic retainer 86.

More specifically, the elastic retainer 86 is received in a circular groove of the internal wall of the sleeve 84 with a radial clearance. The elastic retainer 86 is designed to be clamped about the tubular rod 74 with sufficient force to hold the stabilization tube 44 on the rod 74. The clamping force is however sufficiently low to enable the nozzle tip 26 to be easily removed from the mounting 24.

The tubular rod 74 includes a shallow groove enabling the elastic retainer 86 to be gripped. The stabilization tube 44 is therefore temporarily constrained to move vertically with the tubular rod 74.

To enable the pressure of the forming fluid in the cover 39 to be controlled efficiently, the cover 39 is connected sealingly to the fluid inlet pipe 36 when the carriage 30 is in the forming position thereof, while the cover communicates directly with the atmosphere when the carriage 30 is in the idle position thereof.

For this purpose, the lower ring 82 of the column 32 has a peripheral lip seal 88. As shown in FIG. 5, the lip seal 88 is inserted radially between a lower annular seat 90 of the crown 60 and the ring 82 in the forming position of the carriage 30 to sealingly connect the cover 39 to the feed pipe 36.

In the idle position of the carriage 30, an annular clearance is retained between the lip seal 88 and the skirt 66, as shown in FIGS. 3 and 4.

Furthermore, to ensure uniform pressure in the cover 39 during a forming operation, the tubular rods 74 and the stabilization tube 44 have radial orifices 92 that are intended to distribute the forming fluid throughout all of the zones of the cover 39 and of the inlet pipe 36.

The removable attachment means 94 enabling the nozzle tip 26 to be assembled rigidly but not permanently beneath the movable carriage 30 in the vertical axial direction of the axis "A" of the pre-form 12 are described below with reference to FIGS. 5 and 6.

The attachment means 94 include a male part 96 and a female part 98. In the example shown in the figures, the female part 98 is on the carriage 30 while the male part 96 is on the nozzle tip 26.

The male part 96 is formed by an upper section of the cylindrical crown 60 provided, at the upper extremity thereof, with an annular bead 100 protruding radially outwards, defining a truncated conical seat 102.

The female part 98 of the attachment device 94 includes a mutual locking mechanism for the nozzle tip 26 and the carriage 30. The locking mechanism includes a peripheral tubular cage 104 that is integral with the carriage 30.

The cage 104 is arranged at the lower extremity of the carriage 30. It surrounds the ring 82 such as to reserve an annular space 106, between the outer cage 104 and the inner ring 82, that opens out beneath the lower face 108 of the carriage 30 and that is closed on the opposite side by a ceiling 110.

The carriage 30 has a flange 112 that is arranged above the cage 104. The flange 112 protrudes radially beyond the cage 104 to define a downward facing shoulder.

The cage 104 is perforated radially by an annular row of holes 114. The locking mechanism includes a plurality of ball bearings 116 each seated in a hole 114. Only one ball bearing 116 is shown in the figures. The holes 114 are cylindrical and have a local sectional restriction on the inside, thereby limiting the inward radial clearance of the ball bearings 116.

The locking mechanism also includes a lock 118 mounted slidingly and vertically on the carriage 30. This lock 118 is in the form of a socket with a cylindrical skirt 120 surrounding the carriage 30. The skirt 120 is arranged about the flange 112.

The skirt 120 extends downwards via a section of lesser diameter formed by a hole 122 that is separated from the skirt 120 by an upward facing shoulder surface 123. The internal cylindrical face of the hole 122 has a groove 124.

The lock 118 also includes a truncated conical ramp 126 with the taper facing the lower face 108. The ramp 126 extends upwards from the upper end edge of the groove 124.

A return spring 128 working in compression is mounted about the cage 104 by inserting it between the shoulder surface 123 and the flange 112. The lock 118 can then move vertically by sliding the ramp 126 on the cage 104 between a locked position, shown in FIG. 5, in which the ramp 126 is radially adjacent to the ball bearings 116 and exerts thereupon a radial force oriented towards the axis "A", and a released position, shown in FIG. 6, in which the ramp 126 is separated axially from the ball bearings 116, and in which the groove 124 is radially adjacent thereto. The spring 128, which forces the ramp 126 downwards, permanently pushes the lock 118 towards the locked position thereof.

On account of the peripheral arrangement thereof, the lock 118 is easily accessible. The spring 128 is calibrated to enable a manual movement of the lock 118, against the return force exerted by the spring 128, to the released position thereof.

According to a variant of the invention, the spring 128 is calibrated to prevent a manual movement of the lock 118, against the return force exerted by the spring 128. A tool is then required to slide the lock 118 to the released position thereof.

The locking mechanism also includes an annular slide 130 that is mounted in the annular space 106 between the ring 82 and the cage 104. The slide 130 is mounted slidingly and vertically between a locked position, shown in FIG. 5, in which it is separated from and above the ball bearings 116, and a released position, shown in FIG. 6, in which it is radially adjacent to the ball bearings 116. The return springs 132 working in compression are interposed between the ceiling 110 of the annular space 106 and the slide 130 in order to permanently press the slide 130 towards the released position thereof.

Radial stop pins 134, one of which is shown in FIGS. 5 and 6, extend radially outwards from the slide 130. These pins 134 are received in the vertical slots 136 of the carriage 30 in order to vertically limit the sliding of the slide 130 in both directions and thereby to prevent it from coming out of the annular space 106.

The locking mechanism can adopt two configurations, depending on the position of the lock 118 and of the slide 130.

In a first released configuration, shown in FIG. 6, the lock 118 and the slide 130 are both in the released position thereof. The ball bearings 116 are held radially between the slide 130 on one hand and the groove 124 of the lock 118 on the other. The ball bearings 116 have a part protruding radially outwards from the seat 114 thereof, against which butts the groove 124 under the return force exerted by the spring 128, which limits the travel of the lock 118 and prevents it from becoming separated from the carriage 30. In this first configuration, the travel of the lock 118 is also limited in the other direction by the groove 124 which butts against the protruding part of the ball bearings 116. The lock 118 is then blocked in the released position thereof.

In a second locked configuration, shown in particular in FIG. 5, the lock 118 and the slide 130 are both in the locked position thereof. The slide 130, pushed back against the return spring 132 thereof towards the locked position thereof and therefore away from the ball bearings 116, enables these latter to move radially towards the axis "A" in an internal locked position, under the radial pressure exerted by the ramp 126.

The male part 96 is attached to the female part 98 as follows, on the basis of the released configuration of the female part 98. The male part 96 is first arranged coaxially with the female part 98. The female part has a circular shape about the axis "A". This obviates the need to orient the nozzle tip 26 angularly about the axis "A" in relation to the carriage 30.

The male part 96 is then fitted into the female part 98, the crown 60 entering the annular space 106 by pushing the slide 130 back against the force of the return spring 132.

Until the slide 130 has reached the locked position thereof, the ball bearings 116 remain immobile, holding the lock 118 in the released position thereof. Once the slide 130 has reached the locked position thereof, the ball bearings 116 are pushed back radially towards the inside by the ramp 126 under the pressure of the spring 128, the lock 118 being suddenly moved to the locked position thereof. In this position, the ramp 126 exerts a radial pressure on the ball bearings 116 that are then applied radially against the truncated conical seat 102 of the crown 60, thereby preventing this latter from being removed from the annular space 106 and ensuring that the male part 96 is attached to the female part 98.

The seat 114 is formed such that, in the locked position of the female part 98, the ball bearings 116 protrude sufficiently from the seat 114 thereof to ensure that the male part 96 is solidly held, withstanding an axial tractive force liable to be applied during a forming operation.

To separate the male part 96 from the female part 98, the lock 118 is pushed back, manually or using a tool, towards the released position thereof against the return force exerted by the spring 128. Once the lock 118 has reached the released position thereof, the ball bearings 116 are freed to move radially outwards. Under the effect of the return force exerted by the spring 132, the male part 96 is, by means of the slide 130, pushed back out of the annular space 106.

When the tip 26 moves downwards, the truncated conical seat 102 pushes the ball bearings 116 radially back outwards. The ball bearings 116 seated in the groove 124 block the lock 118 in the released position while enabling the slide 130 to return to the release position thereof. The female part 98 thus returns to the released configuration thereof.

The nozzle 10 carried out according to the teachings of the invention enables the nozzle tip 26 to be swapped quickly thanks to the quick locking mechanism.

Furthermore, the fact of having preassembled nozzle tips 26 for each format of neck 14 makes it possible to change the configuration of the manufacturing facility very quickly to adapt to different neck formats.

The nozzle tips 26 are advantageously swapped by a device (not shown) for changing tips 26, such as an automaton or a robotic arm.

The device has a first disassembly member (not shown) that is designed to grasp the lock in the locked position thereof. The disassembly member is for example formed by a tool such as a clamp or a horizontal fork that can be inserted into an annular groove 138 formed in the external face of the lock 118. Such a groove 118 is in particular shown in FIG. 6. The disassembly member is then in an active position.

The disassembly member is mounted movably and vertically on the device such as to move the lock 118 between the locked position thereof and the released position thereof by contact with the edges of the groove 138.

The device also includes at least a second holding member that is designed to grasp the nozzle tip 26. The holding member is for example formed by a horizontal clamp that can surround and externally clamp the cover 39 just below the flange 64.

The holding member is mounted movably on the device such as to move the nozzle tip 26 vertically between the engaged position thereof inside the female element 98 and a disengaged position outside the female element 98.

The holding member is also able to move the nozzle tip 26 horizontally in order to take a nozzle tip 26 that is no longer in use to a storage space (not shown). The holding member can therefore be moved between the disengaged position of the tip 26 and a storage position in which the tip 26 is arranged adjacent to a storage space located radially away from the nozzle 10.

During an operation to swap a nozzle tip 26, the device first moves the disassembly member from an inactive position in which it is radially distant from the nozzle 10 to the active position thereof.

The device also moves the holding member to the assembly position thereof to grasp the tip 26 in the engaged position thereof.

The disassembly member then moves the lock 118 to the released position thereof. The holding member enables the tip 26 to be held to prevent it from falling.

The holding member is then moved vertically downwards to disengage the nozzle tip 26. The holding member is then moved radially towards the storage position thereof, where it releases the nozzle tip 26 to place it in the storage space.

The holding member is then able to grasp another nozzle tip 26 in the storage space to carry it to the engaged position thereof in the carriage 30. The disassembly member will already have been moved to enable the lock 118 to return to the locked position thereof, thereby enabling the automatic attachment of the new tip 26 to the carriage 30.

Advantageously, the movements of the first disassembly member and/or of the second holding member are controlled automatically.

Such a device makes it possible to swap nozzle tips 26 extremely quickly.

The invention claimed is:

1. A nozzle (10) for forming containers from thermoplastic material by injection of a pressurized fluid into a neck (14) of a pre-form (12), the nozzle (10) comprising:
   a mounting (24) fitted with an inlet pipe (36) for pressurized fluid along a vertical axis (A);
   a nozzle tip (26) that axially extends the inlet pipe (36) and that can be connected sealingly to the neck (14) of the pre-form (12) by means of at least one stabilization tube (44) designed to be coaxial with the neck (14) of the pre-form (12), the diameter of which is such that a circular lower end edge (46) of the tube (44) is received against the lip (18) of the neck (14), the stabilization tube (44) being mounted slidingly and axially in the nozzle tip (26) between a lower stop position against a first stop face (47) of the tip (26) and an upper stop position against a second stop face (48) of the tip (26);
   removable means for attaching the nozzle tip (26) to the mounting (24);

the stabilization tube (44) being embedded in the nozzle tip (26) regardless of the attachment thereof to the mounting (24);

characterized in that the stabilization tube (44) is elastically pressed towards the lower stop position thereof by means of an elastic member (58) that is permanently housed in the mounting (24).

2. The nozzle (10) as claimed in claim 1, characterized in that the mounting (24) includes a carriage (30) sliding axially between an upper idle position and a lower forming position, and in that the nozzle tip (26) is attached to the carriage (30).

3. The nozzle (10) as claimed in claim 2, characterized in that the elastic member (58) acts on the stabilization tube (44) by means of a rod (74) that is mounted slidingly on the mounting (24), the rod (74) being clamped into an elastic retainer (86) on the stabilization tube (44) to temporarily constrain the stabilization tube (44) to move with the rod (74).

4. The nozzle (10) as claimed in claim 2, characterized in that a seal (88) is placed radially between the mounting (24) and the nozzle tip (26) to enable a sealed connection between the tip (26) and the inlet pipe (36) in the blowing position of the carriage (30).

5. The nozzle (10) as claimed in claim 4, characterized in that the seal (88) is borne by the mounting (24).

6. The nozzle (10) as claimed in claim 1, characterized in that the removable attachment means include a male part (96) and a female part (98) that can be fitted together.

7. The nozzle (10) as claimed in claim 6, characterized in that the attachment means include a locking mechanism comprising a truncated conical seat (102) that is attached to the male part (96) and that includes ball bearings (116) that are carried with radial clearance by the female part (96), the ball bearings (116) being able to occupy an internal locking position in which they are pushed against the conical seat (102) to attach the male part (96) to the female part (98).

8. The nozzle (10) as claimed in claim 7, characterized in that the truncated conical seat (102) has a circular shape formed about the axis (A) of the nozzle such that the ball bearings (116) can occupy the locking position thereof regardless of the orientation of the nozzle tip (26) about the axis thereof.

9. The nozzle (10) as claimed in claim 8, characterized in that the female part (98) includes a peripheral cage (104) provided with holes (114) seating the ball bearings (116), and a lock (118) provided with an annular ramp (126), mounted about said cage (104), that can be moved between a locked position in which the ramp (126) is radially adjacent to the ball bearings (116), and a released position in which the ramp (126) is removed from the ball bearings (116).

10. The nozzle (10) as claimed in claim 9, characterized in that the mounting (24) bears the peripheral cage (104), the cage (104) radially delimiting an external annular space (106) in which is mounted a slide (130) that can be moved between a locked position in which it is radially adjacent to the ball bearings (116), and a released position in which it is removed from the ball bearings (116).

11. The nozzle (10) as claimed in claim 10, wherein the mounting (24) includes a carriage (30) sliding axially between an upper idle position and a lower forming position, the nozzle tip (26) is attached to the carriage (30), and the cage (104) and the carriage (30) form an integral assembly.

12. The nozzle (10) as claimed in claim 10, characterized in that the slide (130) is pressed towards the locked position thereof by at least one return spring (132).

13. The nozzle (10) as claimed in claim 9, characterized in that the lock (118) is pressed towards the locked position thereof by at least one return spring (128).

14. The nozzle (10) as claimed in claim 9, characterized in that the lock (118) bears the annular ramp (126).

15. The nozzle (10) as claimed in claim 3, characterized in that a seal (88) is placed radially between the mounting (24) and the nozzle tip (26) to enable a sealed connection between the tip (26) and the inlet pipe (36) in the blowing position of the carriage (30).

16. The nozzle (10) as claimed in claim 11, characterized in that the slide (130) is pressed towards the locked position thereof by at least one return spring (132).

* * * * *